(12) United States Patent
Hefner et al.

(10) Patent No.: US 8,521,187 B2
(45) Date of Patent: Aug. 27, 2013

(54) METHODS AND APPARATUS FOR SESSION CONTROL IN A NETWORKED LOCATIONING SYSTEM

(75) Inventors: Eric Hefner, Gurnee, IL (US); Jignesh Dixit, Schaumburg, IL (US); Amit Raj Trehan, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 369 days.

(21) Appl. No.: 12/557,054

(22) Filed: Sep. 10, 2009

(65) Prior Publication Data

US 2011/0059749 A1 Mar. 10, 2011

(51) Int. Cl.
*H04W 24/00* (2009.01)

(52) U.S. Cl.
USPC .............. 455/456.3; 455/456.1; 379/913

(58) Field of Classification Search
USPC ............. 455/456.1–457, 404.2, 414.1–414.4; 340/8.1, 539.13, 988–996; 379/913; 701/32.4; 705/14.57–14.58, 14.64
See application file for complete search history.

(56) References Cited

U.S. PATENT DOCUMENTS

| | | | | |
|---|---|---|---|---|
| 7,269,428 | B1 * | 9/2007 | Wallenius et al. | 455/456.2 |
| 7,369,860 | B2 * | 5/2008 | Dietrich et al. | 455/456.2 |
| 2003/0181205 | A1 * | 9/2003 | Yiu et al. | 455/426.1 |
| 2006/0079249 | A1 * | 4/2006 | Shim | 455/456.1 |
| 2006/0246920 | A1 | 11/2006 | Shim | |
| 2006/0293066 | A1 | 12/2006 | Edge et al. | |
| 2007/0182547 | A1 | 8/2007 | Wachter et al. | |
| 2007/0185985 | A1 | 8/2007 | Shim et al. | |
| 2008/0014962 | A1 | 1/2008 | Shim | |
| 2008/0070593 | A1 | 3/2008 | Altman et al. | |
| 2009/0036142 | A1 * | 2/2009 | Yan | 455/456.1 |
| 2010/0279712 | A1 * | 11/2010 | Dicke et al. | 455/456.5 |

OTHER PUBLICATIONS

PCT Search Report PCT/US2010/046881 dated Dec. 13, 2010.
OMPT Limited: "OMPT Positioning Enablers" Open Mobile Terminal Platform Jan. 23, 2008.
Donghee Shim et al., Use case for notification based on current location for Supl 2.0, Internet Citation, vol. OMA. LOC WG 2005, No. OMA-LOC-2005-0372R)2-CR-SUPL_RD_2_), Jan. 23, 2008.
Digital Cellular telecommunications system (Phase 2+); Universal Mobile Telecommunications Systems (UMTS); Functional stage 2 description of location services (LCS) (3GPP TS 23.271 version 7.9.0 Release 7) Vpl. 3, V 7.9.0, Oct. 1, 2007.

* cited by examiner

*Primary Examiner* — George Eng
*Assistant Examiner* — Marcus Hammonds

(57) ABSTRACT

A session control method includes establishing a locationing session between a mobile device and a remotely located server over a network, sending information related to the geographical location of the mobile device to the remotely located server after establishing the locationing session, and providing two or more notifications via the mobile device, at predetermined intervals or in response to an event, that the locationing session is active. The user may then validate or invalidate the active session, thereby providing greater control of such information. Additional configuration options are provided to the user in order to control the nature and distribution of such locationing data.

14 Claims, 4 Drawing Sheets

METHODS AND APPARATUS FOR SESSION CONTROL IN A NETWORKED LOCATIONING SYSTEM

The present invention generally relates to locationing used in connection with mobile devices, and more particularly relates to session control and user interfaces used in connection with such devices.

BACKGROUND

It is increasingly common to incorporate locationing services and location-aware applications within mobile devices, particularly "smart-phones," PDAs, netbooks, and the like. Accordingly, it is not unusual for the user of a mobile device to interact with an external network host or server that requests information regarding the geographical location of the user. In such a case, a "locationing session" is typically established in which the mobile device periodically sends location data (determined, for example, via GPS satellites or WiFi signals) to the external server. This locationing session can last for a significant length of time, and may be based on a specified period, on proximity, or on geo-fencing limits (i.e., presence within a specified geometric area). One popular method of providing such location information is through the Secure User Plane Location (SUPL) protocol developed by the Open Mobile Alliance (OMA).

SUPL and other such locationing protocols are, however, undesirable in a number of respects. For example, in currently known SUPL systems, the user is typically only notified that his location is being tracked at the time that the locationing session is actually established. At that time, the user is generally also given the option to validate the session. Thereafter, however, the session might continue without notice to the user for an extended period of time, during which the user may forget that the session is active. In addition to raising privacy concerns, the prolonged and perhaps unwanted provision of locationing services can present a significant drain on power resources.

Accordingly, there is a need for improved control over networked locationing sessions. Other desirable features and characteristics of the present invention will become apparent from the subsequent detailed description and the appended claims, taken in conjunction with the accompanying drawings and the foregoing technical field and background.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

In general, the present invention relates to systems and methods for providing a plurality of notifications (e.g., at predetermined intervals and/or in response to an event) indicating that one or more locationing sessions are ongoing, allowing the user to validate, cancel, or decline establishment of a particular session. A wide range of additional notification options may also provided in various embodiments.

The following detailed description is merely illustrative in nature and is not intended to limit the invention or the application and uses of the invention. Furthermore, there is no intention to be bound by any expressed or implied theory presented in the preceding technical field, background, brief summary or the following detailed description. For the purposes of conciseness, conventional techniques and principles related to user interface components, network communication, locationing, mobile computing devices, and the like, need not be described herein.

Figure 1:
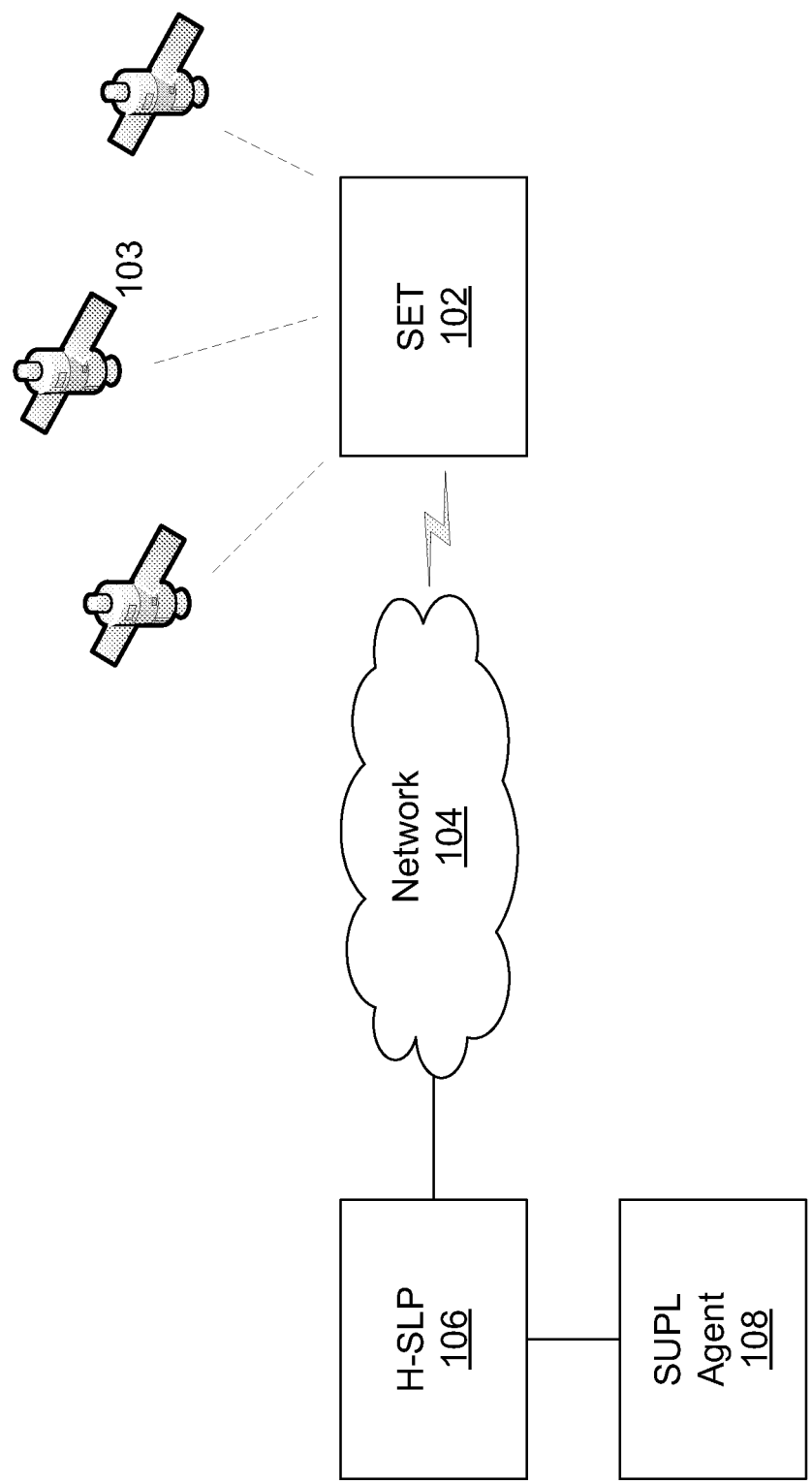
FIG. 1 depicts a wireless network system useful in describing the present invention.

Referring now to FIG. 1, an example wireless network useful in illustrating operation of the present invention will now be described. As a threshold matter, the system and many of its components are described herein in the context of a Secure User Plane Location (SUPL) protocol (see, e.g., OMA-TS-ULP-V2_0-20090831-D UserPlane Location Protocol Draft Version 2.0—31 Aug. 2009 http://www.openmobilealliance.org. It will be appreciated, however, that the SUPL protocol is used without loss of generality, and that the present embodiments are not so limited.

As shown, a mobile device 102 (also referred to as a "SET" (SUPL Enabled Terminal) or "Target SET") is capable of establishing, via network 104, one or more locationing sessions with one or more remotely located servers 106 (also referred to as "H_SLP" (Home SUPL Location Platforms) or simply "servers"). During the locationing session, mobile device 102 receives information regarding its geographic location. This information may be provided in a number of ways, including, for example, via GPS satellites 103, WiFi locationing information, and the like. This information is then provided to server 106 via any suitable protocol and at any convenient intervals. A SUPL agent 108 may direct the operation of server 106 and otherwise take part in the locationing session as is understood from the SUPL protocol.

Locationing information may be provided continuously (at predetermined intervals), or only when the user (i.e., the mobile device) enters a particular geographical region—a practice known as "geo-fencing". In other embodiments, location information is provided based on proximity to a particular geographical location.

As mentioned previously, in prior art systems the user is generally only notified that his location is being tracked at the time that the locationing session is actually established, at which time he or she is given the option to validate the session. Subsequently, the session may continue without notice to the user for an extended period of time. In accordance with the present invention, however, the user is notified at multiple times (e.g., when the session is established, and subsequently at predetermined times or in response to an event) that one or more locationing session are active, and is given the option to selectively terminate and/or validate these sessions.

Figure 4:
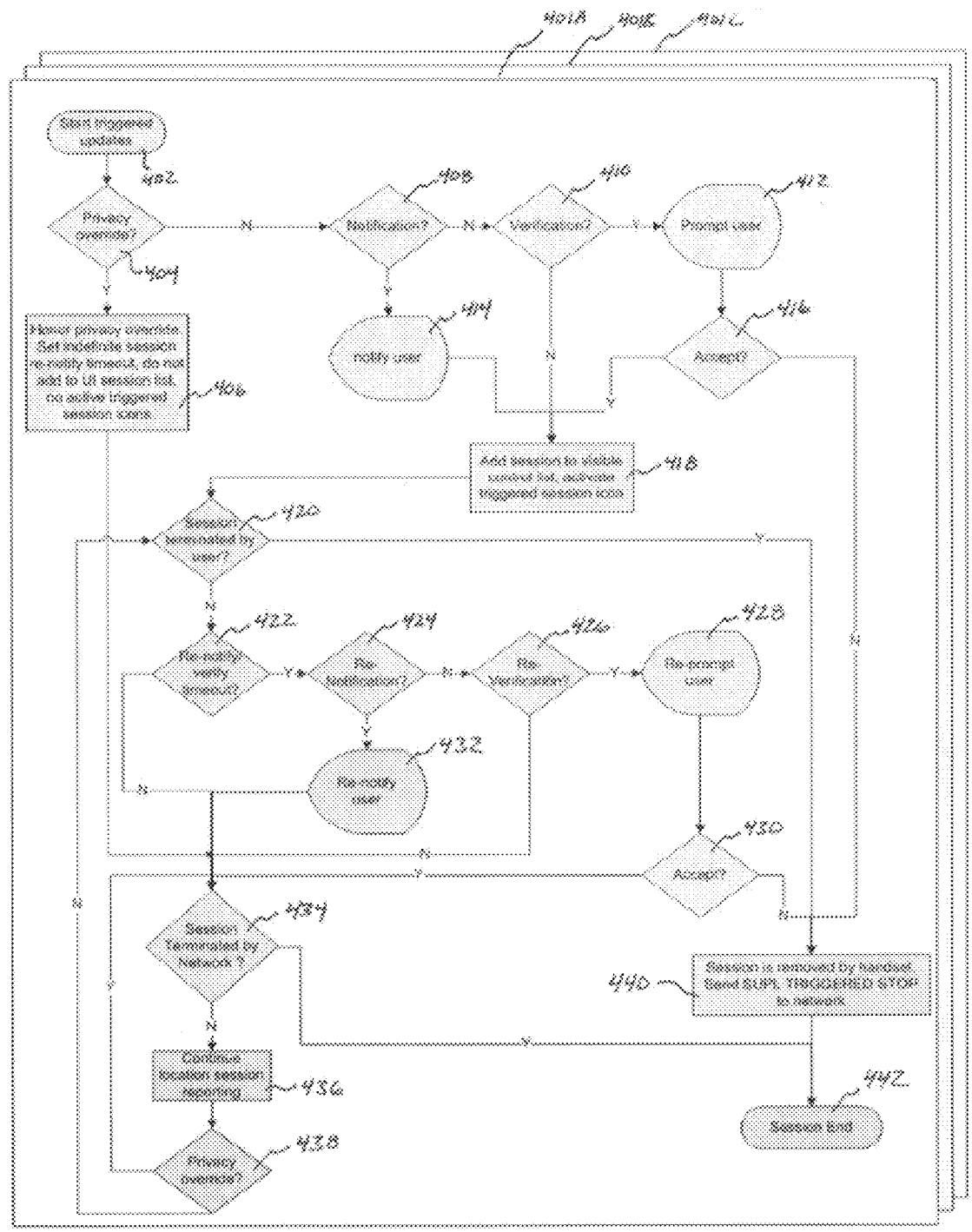
FIG. 4 is a flowchart illustrating a method in accordance with an exemplary embodiment.

Referring now to the flowchart illustrated in FIG. 4, an exemplary process in accordance with one embodiment will now be described. As shown, in step 402, triggered updates are initiated—i.e., a network-initiated SUPL triggered location session. There may be any number of sessions running in parallel, hence the illustration of multiple processes 401A-401C.

If a privacy override is in place (step 404), the system honors the privacy override and sets an indefinite session re-notify timeout (step 406). In such a case, the session is not added to a user interface session list (as detailed below), and no active icons or other indicators need be provided. The process then continues with step 434, as described further below.

If in step 404 there was no privacy override in place, the system then decides whether to notify the user (step 408). If so, a notification is provided (step 414); if not, the system optionally determines whether verification is required (step 410). If verification is required, the user is prompted in any suitable way, and acceptance is determined (steps 412, 416). For example, the user may be prompted via the user interface to manually assent to the session by using a touchscreen, button, or other input device.

If the session was not validated or verified by the user, the session is terminated by the mobile device (step 440), and the session ends (step 442). If, however, the session was validated in step 416, or verification was not required in step 410, the process continues with step 418, where the session is added to the user interface control list, and a triggered session icon is provided to the user.

In step 420, if the session is terminated by the user, the system continues with step 440 as before. If not, the system determines whether it should reverify, re-notify, or timeout (step 422) in accordance with various configuration options. Depending upon the result, the user is re-notified (steps 424, 432), and the session is optionally re-verified (steps 425, 428, and 430).

The process continues at step 434, where a determination is made as to whether the network (i.e., the remotely located server) terminated the session. If so, the system proceeds to step 442; if not, the system continues session reporting (step 436), and optionally implements the privacy override (step 438).

Figure 3:
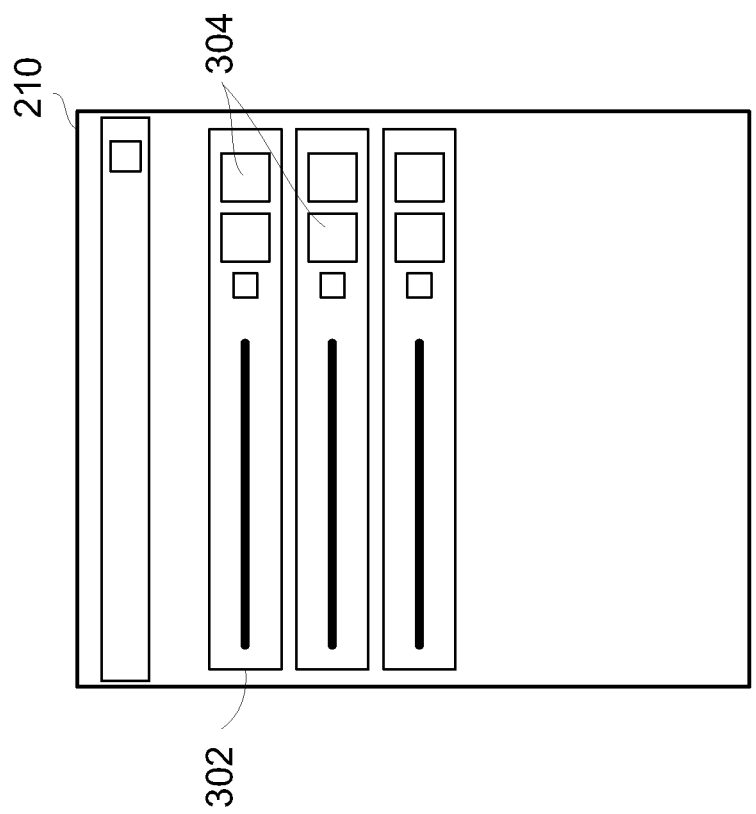
FIG. 3 graphically illustrates an example user interface in accordance with one embodiment.
Figure 2:
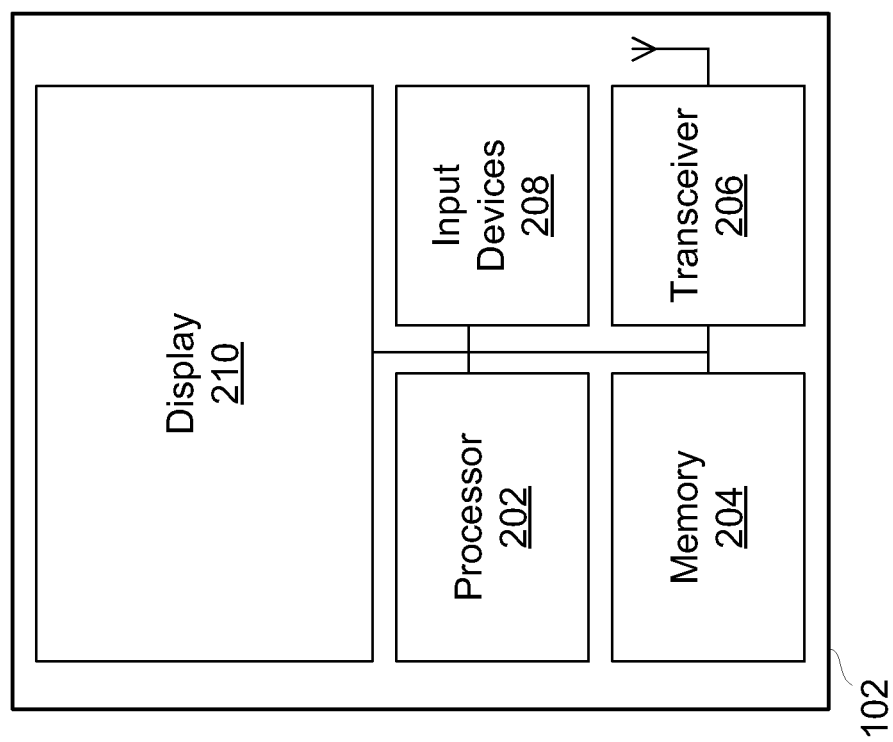
FIG. 2 is a conceptual block diagram depicting an exemplary mobile device in accordance with one embodiment.

The user interface provided to implement such a method may vary depending upon, for example, the hardware and software platforms being used. FIG. 3 shows, schematically, a typical user interface including any number of user interface components or widgets 304, as well as one or more items 302 listing each of the active locationing sessions (the "control list"). In this embodiment, for example, user interface components 304 could be used to select, cancel, and/or configure each of the sessions 302. The present embodiments are not so limited, however, as the user interface may include any number of conventionally known element, such as windows, text boxes, input boxes, check boxes, radio buttons, toggle buttons, standard buttons, sliders, touch-sensitive areas, drop-down menus, and the like.

The user interface components may be configured to provide a wide range of additional functionality. In various embodiments, for example, the user interface is configured to allow the user to periodically generating an indicator that the locationing session is active; adjust a default re-notification and/or re-verification interval; set the maximum locationing session duration; limit the number of active locationing sessions; automatically terminate the locationing session when connection with the remotely located server has been lost; generate an indicator that location information is delivered to the remotely located server; generate a log of information sent during the locationing session (e.g., a log indicating when information was sent, what the information included, etc.); and/or send an external report of the locationing session via the network.

The user interface details and methods described above may be implemented in a variety of mobile devices, including, for example, cellular phones (or "smartphones"), GPS systems, e-book readers, tablet computers, netbook computers, point-of-sale devices, gaming devices, and any other apparatus that may include more than one touchscreen display. In general, however, such devices are typically special-purpose or general-purpose computing devices including one or more microprocessors, memory components, and the like as is known in the art.

Similarly, the systems and methods described herein may be implemented in any mobile device now known or later developed. Referring to FIG. 4, for example, a typical mobile device 102 will generally include one or more processors 202, one or more memory devices 204 (e.g., flash memory, hard drives, MicroSD cards, etc.), an RF transceiver module 206 (e.g., operating in accordance with IEEE 802.11, Zigbee, etc.), a display 210 (e.g., a touchscreen display), and input devices 208 (buttons, LEDs, etc.). In any given embodiment, additional electronic components may be present, including, typically, a power module (e.g., batteries, charging circuits, etc.), a peripheral interface, one or more external ports 412 (e.g., USB, Firewire, etc.), an audio module, and one or more sensors such as acceleration sensors, orientation sensors, and proximity sensors (not illustrated).

In general, a computer program product in accordance with one embodiment comprises a computer usable medium (e.g., memory 404, an optical drive, a USB drive, or the like) having computer-readable program code embodied therein, wherein the computer-readable program code is adapted to be executed by processor 202 (working in connection with an operating system) to implement a method for generating a user interface and/or implementing the method described above. In this regard, the program code may be implemented in any desired language, and may be implemented as machine code, assembly code, byte code, interpretable source code or the like (e.g., via C, C++, Java, Actionscript, Objective-C, Javascript, CSS, XML, etc.).

Figure 5:
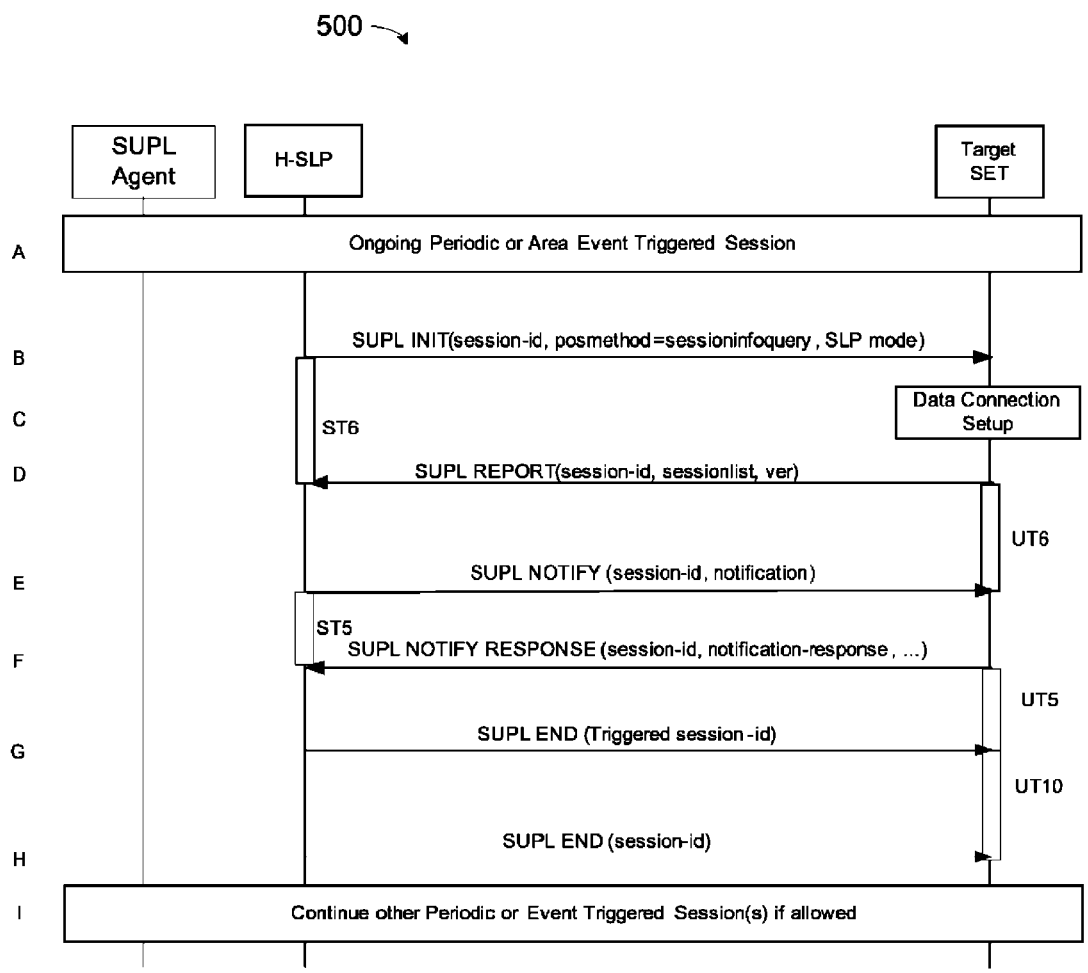
FIG. 5 depicts a partial messaging protocol in accordance with one embodiment.

In a particular embodiment, the session control methods described above are implemented in the context of the SUPL protocol. In that regard, FIG. 5 further depicts a notification process 500 specifically tailored to such an environment. In general, the signaling during an ongoing periodic or area-event triggered session (steps A-I). rows B, C, and D conform to prior art SUPL signaling systems.

The H-SLP initiates the "query for session info" session with the SET using a SUPL INIT message (step B). The SUPL INIT message contains the session-id, posmethod and SLP mode. Query for session information is indicated by posmethod: sessioninfoquery. Before the SUPL INIT message is sent, the H-SLP also computes and stores a hash of the message.

In step C, the SET analyses the received SUPL INIT message. If found to be non authentic, the SET takes no further actions. Otherwise the SET takes needed action preparing for establishment or resumption of a secure connection.

In step D, the SET returns a SUPL REPORT message to the H-SLP including a list of session-ids (sessionlist) of all currently active sessions. The SET MAY also send the SET Capabilities in the SUPL REPORT message. The SUPL REPORT message also contains a hash of the received SUPL INIT message (ver). After sending the SUPL REPORT message, the SET releases all resources related to this session. The SET starts UT6 to wait for either a SUPL NOTIFY in step E or SUPL END in steps G or H.

Step E is optionally performed if re-notification or re-notification and verification is needed based upon a check of the subscriber privacy and the elapsed time since notification and/or verification last occurred for any active sessions. A SUPL NOTIFY is sent to the SET. The H-SLP starts $ST_5$ to wait for the SUPL NOTIFY RESPONSE.

With respect to step F, if step E is performed, the SET sends a SUPL NOTIFY RESPONSE message to the H-SLP. If notification and verification was required in step G, then this will contain the notification response from the user. The SET starts $UT_5$ to await a SUPL END for an active Triggered session or the SUPL END for this Session Info Query Session.

Step G may be performed for two independent cases. First, The SUPL END is conditionally sent when step F occurs and the SET responded with a SUPL NOTIFY RESPONSE containing a response type of "Not Allowed" to deny consent for the re-verification. In this case the SUPL END contains a statusCode of "consentDeniedByUser." The SUPL END identifies the triggered session associated with the re-verification. The SET releases all resources related to the identified triggered session and starts $UT_{10}$ to wait for subsequent SUPL ENDs for active triggered sessions or the SUPL END for this Session Info Query Session.

Second, the SUPL END is optionally sent, independent of steps E and F, to cancel any active triggered session without waiting for the next Periodic or Area Event trigger. The H-SLP may end any active sessions as reported in step D. The SET starts $UT_{10}$ to wait for subsequent SUPL ENDs for active triggered sessions, or the SUPL END for this Session Info Query Session.

Steps E, F, G are repeated for any active sessions reported in step D which require re-notification/re-notification and verification or termination as determined by the H-SLP.

In step H, the H-SLP sends the SUPL END message to the SET, informing it that no further positioning procedure will be started and that the location session is finished. The SET releases the secure connection to the H-SLP and releases all resources related to this session. This step shall occur before the expiry of UT6, or $UT_5$, when started in Step F, or before the expiry of $UT_{10}$ when started in step G.

In the illustrated environment, the following timers are employed:

| | | | |
|---|---|---|---|
| UT1 | 11 | For immediate applications, from sending of SUPL START to receipt of SUPL RESPONSE or SUPL END. In trigger positioning, from sending of SUPL TRIGGERED START to receipt of SUPL TRIGGERED RESPONSE or SUPL END. | The SET sends SUPL END to the SLP. The SET clears all session resources at the SET. |
| UT2 | 11 | From sending of SUPL POS INIT to receipt of first SUPL POS, SUPL REPORT or SUPL END message. UT2 is not needed if the SUPL POS INIT message contains the first SUPL POS element (SET initiated TIA-801). | For immediate applications the SET sends SUPL END to the SLP and clears all session resources. For triggered applications, the SET skips the SUPL POS session and continues the triggered session. |
| UT3 | 10 | From sending of the last SUPL POS message to receipt of SUPL END, SUPL REPORT or SUPL NOTIFY. In cases where there is no SUPL POS message sent from SET, timer UT3 is not used. | For immediate applications, the SET sends SUPL END to the SLP and clears all session resources. For triggered applications, the SET continues the triggered session. |
| UT4 | 10 | Only applicable to non-proxy mode. From sending of SUPL AUTH REQ to receipt of SUPL AUTH RESP message. | The SET sends SUPL END to the SLP. The SET clears all session resources. |
| UT5 | 10 | Only applicable to "notification based on location" or Session Info Query "re-notification" scenarios. From sending of SUPL NOTIFY RESPONSE to receipt of SUPL END. | The SET sends SUPL END to the SLP. The SET clears all session resources. |
| UT6 | 10 | Only applicable to "notification based on location" in non-proxy mode or Session Info Query scenarios. From sending of SUPL REPORT to receipt of SUPL NOTIFY or SUPL END. | The SET sends SUPL END to the SLP. The SET clears all session resources. |
| UT7 | 10 | Only applicable to triggered scenarios. From sending of SUPL TRIGGERED STOP to receipt of SUPL END. | The SET sends SUPL END to the SLP. The SET clears all session resources. |
| UT8 | 10 | Only applicable to triggered periodic scenarios. From sending the last SUPL REPORT message to receipt of SUPL END. | The SET sends SUPL END to the SLP. The SET clears all session resources. |
| UT9 | 60 | Only applicable to SET Initiated Location Request of Another SET. From sending of SUPL SET INIT to receipt of SUPL END. | The SET sends SUPL END to the SLP. The SET clears all session resources. |
| UT10 | 10 | Only applicable to the Session Info Query scenarios From Receipt of SUPL END for an active triggered session to receipt of SUPL END for the Session Info Query Session | The SET sends SUPL END to the SLP. The SET clears all session resources. |

Accordingly, what has been presented are systems and methods that periodically notify the user when locationing sessions are active, and allow the user to terminate and/or configure each of those sessions in any number of ways.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient and edifying road map for implementing the described embodiment or embodiments. It should be understood that various changes can be made in the function and arrangement of elements without departing from the scope of the invention and the legal equivalents thereof.

What is claimed is:

1. A session control method, comprising:
   establishing a locationing session between a mobile device and a remotely located server over a network;
   sending information related to the geographical location of the mobile device to the remotely located server after establishing the locationing session; and
   providing, via the mobile device, a plurality of notifications after establishing the location session, wherein the plurality of notifications each indicate that the locationing session is active and presents a user interface to a user of the mobile device that allows the user to selectively authorize the locationing session;
   wherein the user interface includes a list of active locationing sessions and a periodic indicator denoting that at least one of the locationing sessions is active; and
   wherein the user interface further includes a plurality of user interface components configured to allow the user to perform a set of functions comprising:

terminating one or more active locationing sessions;
adjusting a default re-notification and/or re-verification interval;
setting a maximum locationing session duration; and
limiting a number of active locationing sessions.

2. The method of claim 1, wherein the indicator is selected from the group consisting of visual cues and audio cues.

3. The method of claim 1, wherein the plurality of notifications are provided periodically or in response to an event.

4. The method of claim 1, wherein the remotely located server and the mobile device are configured to communicate in accordance with a Secure User Plane Location protocol.

5. The method of claim 1, further including:
sending a notify message from the remotely located server to the mobile device;
in response to the notify message, providing the notification to a user;
waiting for user input either validating or declining validation of the locationing session;
providing a report message to the remotely located server in response to the user input.

6. The method of claim 1, wherein the locationing session is established by the mobile device, or in response to a message from the remotely located server.

7. The method of claim 1, wherein the notification is periodic, and has a rate specified by the remotely located server.

8. A mobile device comprising:
a processor;
a memory communicatively coupled to the processor;
a display communicatively coupled to the processor;
at least one user input device communicatively coupled to the processor; and
a transceiver communicatively coupled to the processor and configured to establish a locationing session with a remotely located server over a network;
wherein the processor is configured to provide a user interface for displaying a plurality of notifications that the locationing session is active and allows the user to selectively authorize the locationing session;
wherein the user interface includes a list of active locationing sessions and a periodic indicator denoting that at least one of the locationing sessions is active; and
wherein the user interface further includes a plurality of user interface components configured to allow the user to perform a set of functions comprising:
terminating one or more active locationing sessions;
adjusting a default re-notification and/or re-verification interval;
setting a maximum locationing session duration; and
limiting a number of active locationing sessions.

9. The mobile device of claim 8, wherein the plurality of notifications include an indicator selected from the group consisting of visual cues and audio cues.

10. The mobile device of claim 8, wherein the mobile device is configured to communicate in accordance with a Secure User Plane Location protocol.

11. The mobile device of claim 8, wherein the locationing session is established in response to a message from the remotely located server.

12. The mobile device of claim 8, wherein the processor is configured to:
provide the plurality of notifications to the user, via the display, in response to a notify message received from the remotely located server,
wait for user input via the at least one input device either validating or declining validation of the locationing session;
providing a report message to the remotely located server in response to the user input.

13. A non-transitory, tangible computer program product, comprising a computer usable medium having a computer-readable program code embodied therein, the computer-readable program code adapted to be executed to implement a method for generating a user interface, the method comprising:
establishing one or more active locationing sessions with a remotely located server over a network;
sending information related to the geographical location of the mobile device to the remotely located server after establishing the one or more active locationing sessions; and
providing a notification via the mobile device, at predetermined intervals or in response to an event, that the one or more active locationing sessions are active and presenting a user interface to a user of the mobile device that allows the user to selectively authorize the one or more active locationing sessions;
wherein the user interface further includes a plurality of user interface components configured to allow the user to perform a set of functions comprising:
terminating one or more active locationing sessions;
adjusting a default re-notification and/or re-verification interval;
setting a maximum locationing session duration; and
limiting a number of active locationing sessions.

14. The computer program product of claim 13, wherein the mobile device is configured to communicate in accordance with a Secure User Plane Location protocol.

* * * * *